(12) United States Patent
Choi et al.

(10) Patent No.: US 7,620,044 B2
(45) Date of Patent: Nov. 17, 2009

(54) APPARATUS AND METHOD FOR TRANSFERRING DATA BURSTS IN OPTICAL BURST SWITCHING NETWORK

(75) Inventors: Jung Yul Choi, Yuseong-Gu (KR); Min Ho Kang, Seocho-Gu (KR)

(73) Assignee: Research and Industrial Cooperation Group, Dae-Shi (KR)

( * ) Notice: Subject to any disclaimer, the term of this patent is extended or adjusted under 35 U.S.C. 154(b) by 438 days.

(21) Appl. No.: 11/496,200

(22) Filed: Jul. 31, 2006

(65) Prior Publication Data

US 2007/0189285 A1    Aug. 16, 2007

(30) Foreign Application Priority Data

Feb. 13, 2006    (KR) .................... 10-2006-0013725

(51) Int. Cl.
*H04L 12/56*    (2006.01)
(52) U.S. Cl. .................... 370/389; 370/252; 370/351
(58) Field of Classification Search ........... 370/389, 370/352, 375; 398/45, 57, 47
See application file for complete search history.

(56) References Cited

U.S. PATENT DOCUMENTS 5,469,284 A * 11/1995 Haas ...................... 398/54
5,828,472 A * 10/1998 Masetti ................... 398/47
6,850,515 B2 * 2/2005 Chang et al. ............. 370/352

FOREIGN PATENT DOCUMENTS

| KR | 1020010025595 | 4/2001 |
| KR | 1020030043206 | 6/2003 |
| KR | 1020030060160 | 7/2003 |
| KR | 1020040003455 | 1/2004 |
| KR | 1020040070477 | 8/2004 |
| KR | 1020050065503 | 6/2005 |

OTHER PUBLICATIONS

Tao Zhang et. al., "Architectures and Performance of Fiver Delay Line Buffers in Packet-Based Multifiber Optical Networks," Optical Society of America.

(Continued)

*Primary Examiner*—Dang T Ton
*Assistant Examiner*—Pamit Kaur
(74) *Attorney, Agent, or Firm*—The Webb Law Firm (57) ABSTRACT

In an apparatus and method for transferring data bursts in an optical burst switching network, a control module connected between demultiplexers and multiplexers obtains information in control packets of data bursts to sort and confirm service classes of the data bursts according to delay time and blocking rate. A switching unit switches the data bursts to an output port of a corresponding destination node. A first buffer delays data bursts from the control module once by a preset delay time according to output resource availability and sends them to the output port when the data bursts are sensitive to delay time. A second buffer circulates and delays the sorted and confirmed data bursts up to a preset limit according to output resource availability and then sends the data bursts to the output port when the data bursts are insensitive to delay time.

7 Claims, 6 Drawing Sheets

OTHER PUBLICATIONS

M.C. Chia et. al., "Packet Loss and Delay Performance of Feedback and Feed-Forward Arrayed-Waveguide Gratings-Based Optical Packet Switches With WDM Inputs-Outputs," Journal of Lightwave Technology, vol. 19 No. 9, Sep. 2001, pp. 1241-1254.

Shou-Kuo Shao et. al., "Performance Analysis of Feedback Type WDM Optical Routers Under Asynchronous and Variable Packet Length Self-Similar Traffic," Optical Society of America, pp. 282-286.

* cited by examiner

Fiber delay line (FDL) having unit delay time of 1

APPARATUS AND METHOD FOR
TRANSFERRING DATA BURSTS IN OPTICAL
BURST SWITCHING NETWORK

BACKGROUND OF THE INVENTION

1. Field of the Invention

The present invention relates to an apparatus and method for transferring data bursts in an optical burst switching network, and more particularly, to an apparatus and method for transferring data bursts in an optical burst switching network which are capable of efficiently transferring data bursts with a minimized delay time and a low loss rate by using a hybrid optical buffer having a feed-forward type buffer shared in each port and a feedback type buffer shared in each node, the hybrid optical buffer using fiber delay lines (FDLs) to provide class-differentiated service.

2. Description of the Related Art

An optical burst switching (OBS) technique generally involves a unidirectional reservation technique of first sending a control packet to a destination node for resource reservation and directly transferring burst data without confirming whether the resource is reserved. In this case, intermediate nodes directly transfer the burst data without performing optical-electrical conversion.

Since the data bursts are transferred without confirming whether resource is secured at all nodes on paths to the destination node, they are inevitably lost in the nodes.

To solve this problem, several loss avoidance methods have been suggested, such as a method employing a wavelength converter, a method employing an fiber delay line (FDL) based buffer, a method of discarding contending portions of data bursts, and a method using a deflection routing.

Among these methods, the method employing a fiber delay line (FDL) based buffer is the best because when contention between the data bursts occur, data bursts are delayed through fiber delay lines (FDLs) by a contention time and then transferred.

This method is similar with that used in the Internet. In the Internet, a random access memory (RAM) is used as a buffer to store data for an exact contention time and then send the data. On the other hand, the fiber delay line (FDL) based buffer can store data for a time corresponding to a fixed length of the line.

In addition, because the data bursts are transferred along an unnecessarily long path, physical loss such as signal attenuation may occur. The buffer is directly connected to a switch, and accordingly increase in a buffer size is closely related to increase in a switch size. Accordingly, determination of the buffer size is a critical issue.

Fiber delay line (FDL) based buffers may be classified into a feed-forward type buffer and a feedback type buffer. The feed-forward type buffer can be used only once. If data bursts contend with each other at an output port, a buffer having a fixed length is used. At this time, the data bursts are exited from the buffer regardless of success of burst transmission.

On the other hand, in the feedback type buffer, data bursts are circulated through the buffer until output resource is available or up to an allowed maximum number of times if the output resource is not available after one round of buffering. This provides more buffering chances and thus a higher transmission success rate, but causes excessive buffering delay and signal attenuation.

Meanwhile, in an optical burst switching network, buffers may be classified into a buffer exclusively used for each wavelength, a buffer shared in a port with a number of wavelengths multiplexed, and a buffer shared in one switching network, depending on a buffer location.

These buffers have merits and demerits according to the size of a switching fabric and a sharing degree of resource. That is, when the buffers are exclusively used for each wavelength, a transmission success rate may be high but the size of the switch increases due to there being a large number of buffers. On the other hand, when a buffer is shared in the optical burst switching network, the size of the switch structure may decrease but the transmission success rate may be low.

Meanwhile, it is critical to provide class-differentiated service in an optical burst switching network. As previously stated, once the data bursts are transferred, intermediate nodes send the data bursts through a switching operation without a process of obtaining control information through optical-electrical conversion for acquiring information about a destination node. Thus, the loss of the data bursts is a more important problem than delay time.

Accordingly, services are differentiated according to loss of data bursts. An extra offset time is conventionally introduced to provide differentiated services. In this case, a control packet is sent much earlier in order to reserve resources in advance and transfer data bursts having a high priority. In this manner, by securing output resources for data bursts having higher priority earlier than for data bursts having lower priority, class-differentiated loss rates are obtained. However, the higher the priority of a data burst, the longer it is delayed prior to transmission.

In another conventional method, when different classes are in contention for output resource, they are arbitrarily blocked at a preset rate. This enables loss rates for the classes to differ from one another in the optical burst switching network, but the loss rates are too high and resources of the optical burst switching network cannot be used efficiently.

In another conventional method, input packets of each class are laid at a pre-selected location in optical bursts. When a contention between data bursts occurs, a portion of the data burst containing a packet having lower priority is cut out and a portion of the data burst containing a packet having higher priority is transferred, thus increasing the transmission success rate of higher priority packets.

In another conventional method, a group of wavelengths that can be used by different classes is virtually divided and dynamically re-arranged according to a state of an optical burst switching network, so that when there are classes having a high priority, wavelengths are preoccupied so as not to be occupied by traffic having a low priority, thus providing class-differentiated service.

Since, in such conventional service differentiating schemes, an overall blocking rate in the optical burst switching network is divided for each class, classes having higher priority have a lower blocking rate and classes having lower priority are subject to a relatively higher blocking rate. Accordingly, there is need for a scheme capable of providing differentiated service with a low blocking rate for all classes.

SUMMARY OF THE INVENTION

It is an object of the present invention to provide an apparatus and method for transferring data bursts in an optical burst switching network which are capable of efficiently transferring data bursts with a minimized delay time and a low loss rate and satisfying various service demands by using a hybrid optical buffer having a feed-forward type buffer shared in each port and a feedback type buffer shared in each node, the hybrid optical buffer using fiber delay lines (FDLs) to provide class-differentiated service in the optical burst switching network.

A first aspect of the present invention provides an apparatus for transferring data bursts in an optical burst switching network including a number of nodes, each node including demultiplexers and multiplexers connected to a plurality of input/output ports for transferring the data bursts through a number of wavelengths, the apparatus comprising: a control module connected between the demultiplexers and the multiplexers for obtaining information in a control packet to sort and confirm service classes of the data bursts according to delay time and blocking rate; a switching unit connected between the demultiplexers and the multiplexers for switching the data bursts to an output port of a corresponding destination node; a first buffer connected between the switching unit and the output port for delaying the sorted and confirmed data bursts from the control module once by a preset delay time according to output resource availability and sending them to the output port when the data bursts are sensitive to delay time; and a second buffer connected between an input and an output of the switching unit for circulating and delaying the sorted and confirmed data bursts up to a preset recirculation limit according to output resource availability and then sending the data bursts to the output port when the data bursts are insensitive to delay time.

Preferably, each of the first and second buffers comprises a plurality of fiber delay lines (FDLs), each FDL providing a preset unit delay time D.

Preferably, the output resource is an output wavelength.

A second aspect of the present invention provides a method for transferring data bursts in an optical burst switching network including a number of nodes, each node including a plurality of input/output ports, the method comprising: (a) sorting and confirming data bursts input via the input ports into a plurality of classes according to sensitivity to delay time and blocking rate; (b) delaying data bursts belonging to a class sensitive to delay time once by a preset delay time and then transmitting the data bursts to the output port; and (c) circulating and delaying data bursts belonging to a class insensitive to delay time up to a preset recirculation limit and then transmitting the data bursts to the output port.

Preferably, in step (b), data bursts belonging to a class sensitive to delay time and blocking rate among the sorted and confirmed classes have a higher priority than data bursts belonging to a class sensitive only to delay time.

Preferably, the data bursts belonging to the class sensitive to delay time and blocking rate are for video conference or video telephone service, and the data bursts belonging to the class sensitive only to delay time are for Voice over Internet Protocol (VoIP) service.

Preferably, in step (c), data bursts belonging to a class insensitive to delay time but sensitive to blocking rate among the sorted and confirmed classes have a higher priority than data bursts belonging to a class insensitive to both delay time and blocking rate.

Preferably, the data bursts belonging to the class insensitive to delay time but sensitive to blocking rate are for file transfer protocol (FTP) service, and the data bursts belonging to the class insensitive to delay time and blocking rate are for web or E-mail traffic service.

DETAILED DESCRIPTION OF EXEMPLARY EMBODIMENTS

The present invention will now be described more fully with reference to the accompanying drawings, in which exemplary embodiments of the invention are shown.

Figure 1:
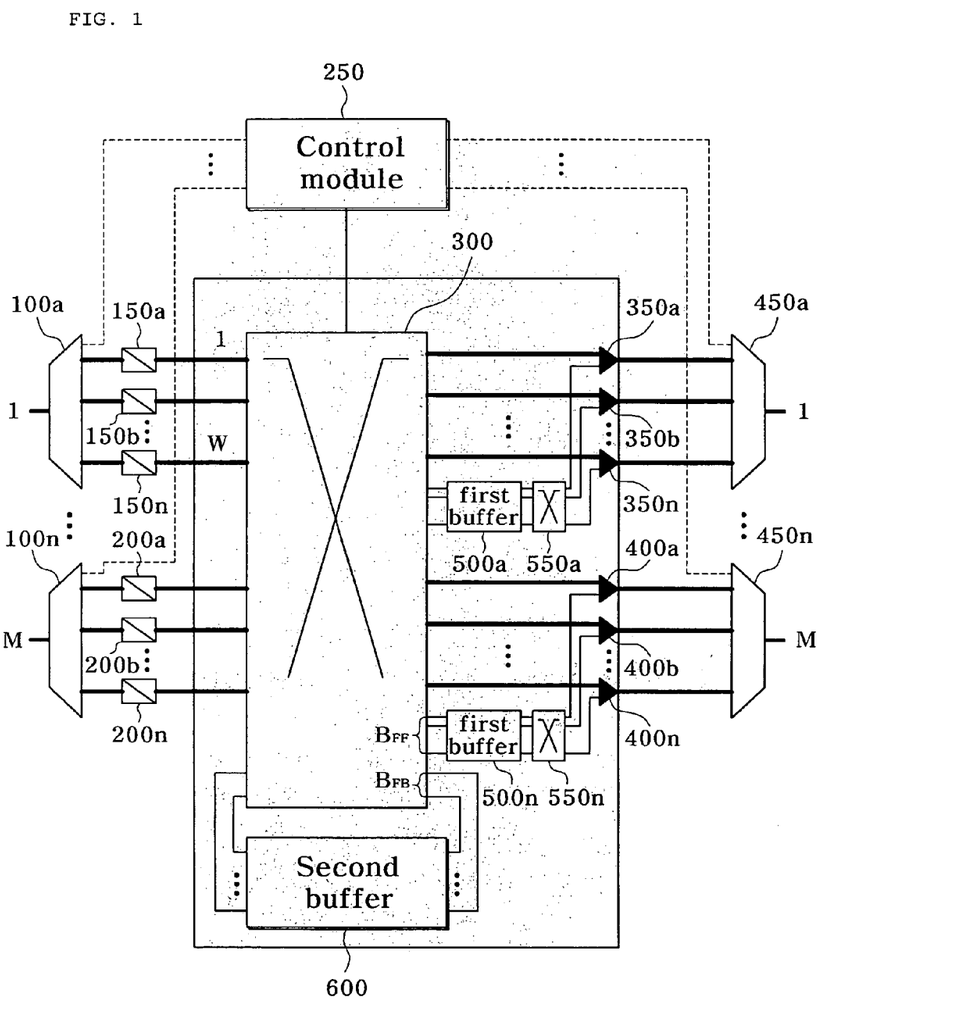
FIG. 1 is a block diagram illustrating a node having an apparatus for transferring data bursts in an optical burst switching network according to an exemplary embodiment of the present invention.
Figure 2:
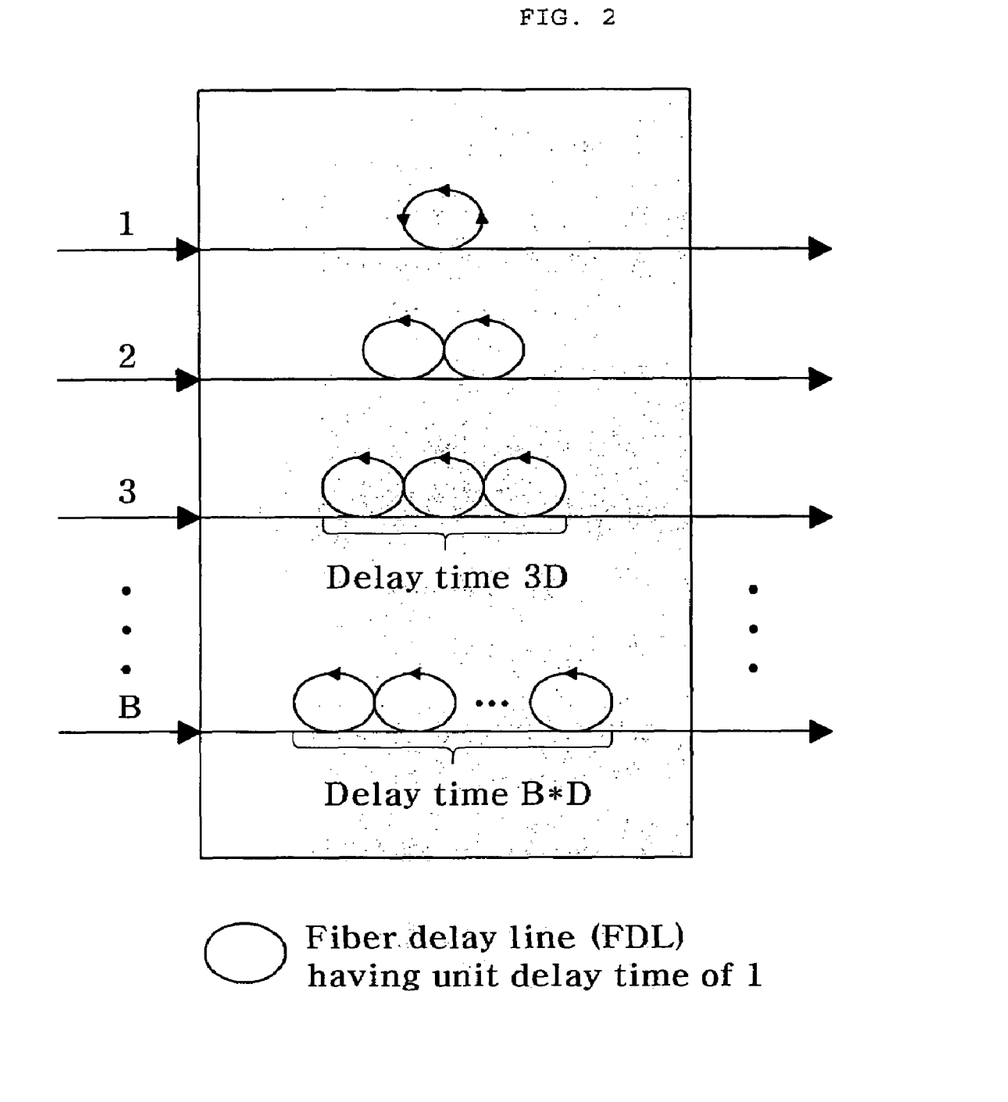
FIG. 2 is a conceptual diagram illustrating a structure of first and second buffers according to an exemplary embodiment of the present invention.

FIG. 1 is a block diagram illustrating a node having an apparatus for transferring data bursts in an optical burst switching network according to an exemplary embodiment of the present invention, and FIG. 2 is a conceptual diagram illustrating a structure of first and second buffers according to an exemplary embodiment of the present invention Referring to FIGS. 1 and 2, a node having an apparatus for transferring data bursts in an optical burst switching network according to an exemplary embodiment of the present invention includes demultiplexers $100a$ to $100n$, wavelength converters $150a$ to $150n$ and $200a$ to $200n$, a control module $250$, a first switching unit $300$, combiners $350a$ to $350n$, $400a$ to $400n$, multiplexers $450a$ to $450n$, first buffers $500a$ to $500n$, second switching units $550a$ to $550n$, and a second buffer $600$.

Each of the demultiplexers $100a$ to $100n$ is connected to one of a number of input ports 1 to M for transferring optical bursts. The demultiplexers $100a$ to $100n$ receive the optical bursts from the input ports 1 to M, separate the optical bursts into a control packet and a data burst, and output them through a number of wavelengths (1 to W, the total number of wavelengths per port being W).

The wavelengths in the ports are connected to a next node by the multiplexers $450a$ to $450n$ and the demultiplexers $100a$ to $100n$. Further, the wavelengths are respectively connected to the wavelength converters $150a$ to $150n$ and $200a$ to $200n$. The wavelength converters freely select available wavelengths and transmit the data bursts through the wavelengths, which need not be continuous.

The wavelength converters $150a$ to $150n$ and $200a$ to $200n$ are connected to the output of the demultiplexers $100a$ to $100n$ for receiving the data bursts separated by the demultiplexers 100a to 100n and changing wavelengths of the data bursts so that each data burst has an independent wavelength.

The control module 250 is connected between the demultiplexers 100a to 100n and the multiplexers 450a to 450n. The control module 250 receives the control packet separated by the demultiplexers 100a to 100n and recognizes a destination node of the data bursts from information in the control packet. Further, the control module 250 sorts and confirms service classes of the data bursts according to sensitivity to delay time and blocking rate.

Particularly, an edge node determines the service classes in consideration of requirements regarding delay time and blocking rate in creating the control packet, and stores information about the service classes in the control packet. Accordingly, each node can recognize the service classes from the information in the control packet but not detailed information about target delay time and blocking rate.

The first switching unit 300 is connected to the outputs of the wavelength converters 150a to 150n and 200a to 200n, and between the demultiplexers 100a to 100n and the multiplexers 450a to 450n. The first switching unit 300 performs a function of switching each data burst to an output port of a suitable destination node.

The combiners 350a to 350n and 400a to 400n are connected between the first and second switching units 300 and 550a to 550n and the multiplexers 450a to 450n for combining data bursts having the same wavelength output from the first and second switching units 300 and 550a to 550n and outputting a combined data burst.

The multiplexers 450a to 450n are connected between the combiners 350a to 350n and 400a to 400n and the output ports 1 to M for multiplexing the data burst output from the combiners 350a to 350n and 400a to 400n and outputting it to a next node via one output port.

The first buffers 500a to 500n are feed-forward type buffers each shared in each of the output ports 1 to M, i.e., connected between the first switching unit 300 and the output ports 1 to M. When the data bursts classified by the control module 250 are sensitive to delay time, the first buffers 500a to 500n delay the data bursts once by a preset delay time depending on output resource availability (e.g., output wavelength availability), preferably, when the output resource is not available, and then sends the data burst to the destination output port.

Each of the first buffers 500a to 500n of the feed-forward type is composed of a plurality ($B_{FF}$) of fiber delay lines (FDLs) A maximum buffer delay time due to the FDLs is equal to the product of the number of FDLs and a unit delay time D.

For example, if the number of FDLs is B, the maximum buffer delay time is B*D. The first buffers 500a to 500n are accessible only once as shown in FIG. 1. Accordingly, when the output resource and the first buffers 500a to 500n are not available, traffic, i.e., data bursts, are immediately lost.

The second switching units 550a to 550n are connected between the first buffers 500a to 500n and the combiners 350a to 350n and 400a to 400n for switching the data bursts from the first buffers 500a to 500n to suitable output wavelengths to be sent to the destination node.

The second buffer 600 is a feedback type buffer shared in each node, i.e., connected between the input and the output of the first switching unit 300. When the classified data burst from the control module 250 is insensitive to delay time, it is circulated through the second buffer 600 up to a preset recirculation limit depending on output resource availability (preferably, when the output resource is not available), and then sent to the output port.

The second buffer 600 of the feedback type is composed of a plurality ($B_{FB}$) of fiber delay lines (FDLs). In this case, a recirculation limit is R. Accordingly, a maximum delay time in the second buffer 600 is B*D*R. Buffering in the second buffer 600 is performed by data bursts circulating through the second buffer up to the recirculation limit when the output resource is not available.

As shown in FIG. 2, the first and second buffers 500a to 500n and 600 all have the same structure. Each buffer includes B fiber delay lines (FDLs), which can store traffic, i.e., data bursts for a time corresponding to each length. Thus, the buffer can provide a maximum delay time corresponding to B*D.

Figure 3:
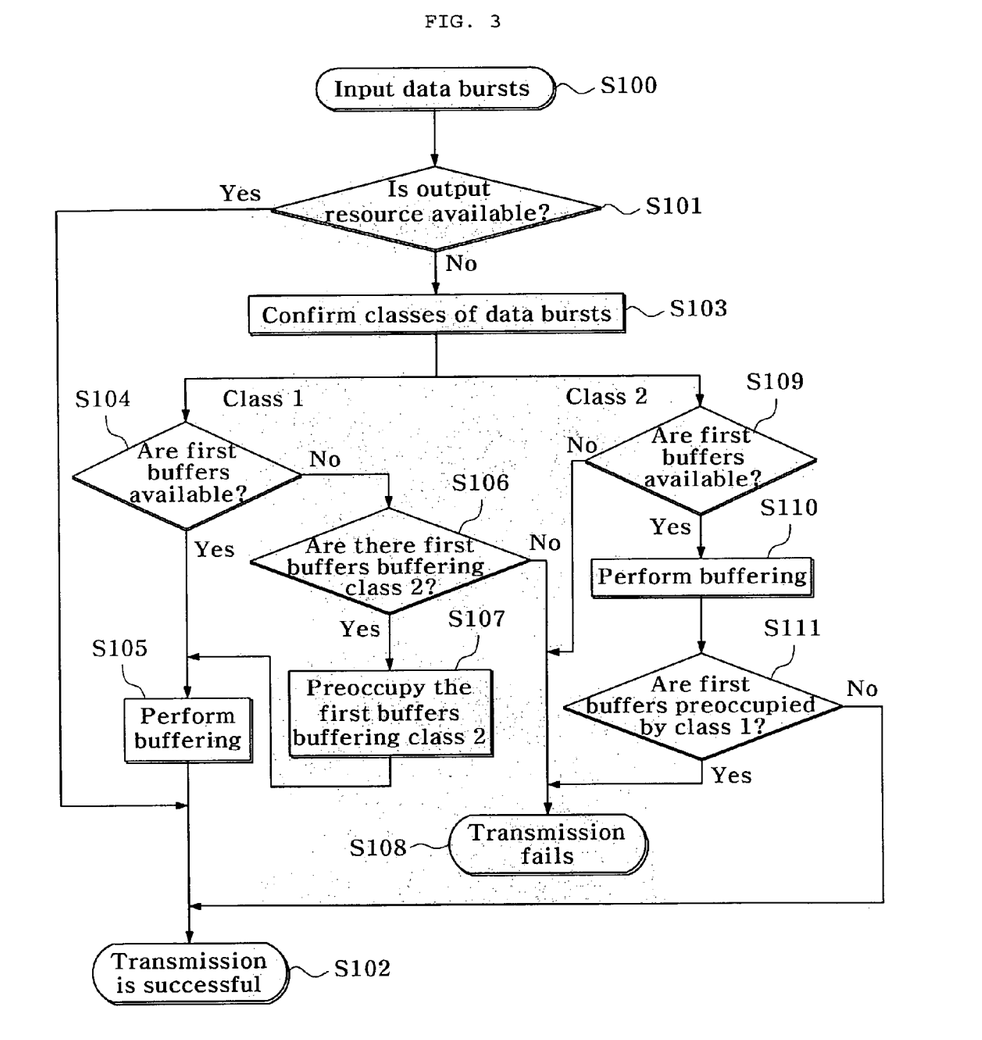
FIG. 3 is a flowchart illustrating a process of transferring data bursts belonging to a class sensitive to delay time in a method for transferring data bursts in an optical burst switching network according to an exemplary embodiment of the present invention.

FIG. 3 is a flowchart illustrating a process of transferring data bursts belonging to a class sensitive to delay time in a method for transferring data bursts in an optical burst switching network according to an exemplary embodiment of the present invention. The process is performed by the control module 250 of FIG. 1, unless stated otherwise.

Referring to FIG. 3, when data bursts are input via the input ports 1 to M of FIG. 1 (S100), availability of output resource (e.g., output wavelengths) is checked (S101). When the output resource is available, the data bursts are successfully transferred (S102). Otherwise, classes of the data bursts, which are variously classified depending on whether the data bursts are sensitive to delay time and blocking rate, is confirmed (S103). In this case, the classes of data bursts can be confirmed through information contained in a control packet.

When it is determined in step S103 that the data burst belongs to class 1 (which is sensitive to both delay time and blocking rate), it is determined whether the first buffers 500a to 500n of a feed-forward type of FIG. 1, shared at the output ports 1 to M of FIG. 1, are available (S104).

When it is determined in step S104 that the first buffers 500a to 500n are available, the data bursts are successfully transferred (S102) by using the first buffers 500a to 500n and reserving the output resource, i.e., performing buffering (S105).

When the first buffers 500a to 500n are not available, it is determined whether class 2 data bursts (which are sensitive only to delay time) are using the first buffers 500a to 500n (S106). When the class 2 data bursts are using the first buffers 500a to 500n, the class 2 data bursts are discarded, and new class 1 data bursts use the first buffers 500a to 500n and the output resource. That is, the class 1 data bursts preempt the first buffers 500a to 500n having class 2 (S107).

In this case, the class 2 data bursts are lost. In this manner, the class 1 data bursts are serviced with the highest priority with regard to delay time and blocking rate.

On the other hand, when it is determined in step S106 that the first buffers 500a to 500n are all used by class 1 data bursts, the input class 1 data bursts are not successfully transferred (S108).

When it is determined in step S103 that the input data bursts belongs to class 2 (which are sensitive only to delay time), it is determined whether the first buffers 500a to 500n of a feed-forward type are available (S109). When the first buffers 500a to 500n are not available, the process returns to step S108 and data burst transmission fails.

When it is determined in step S109 that the first buffers 500a to 500n are available, contention is avoided by using the first buffers 500a to 500n and the output resource is reserved. That is, buffering is performed (S110). It is also determined whether the first buffers 500a to 500n are preoccupied by class 1 prior to complete transmission to the output ports 1 to M, i.e., whether class 1 data bursts attempt to use the first buffers 500a to 500n (S111). When class 1 data bursts attempt to use the first buffers 500a to 500n, the buffered class 2 data bursts concede the buffers to the class 1 data bursts and are lost. That is, the process returns to step S108 and data burst transmission fails. Otherwise, the process returns to step S102 and the data bursts are successfully transferred.

Meanwhile, class 1 indicates data bursts sensitive to both delay time and blocking rate. Examples of application services corresponding to class 1 are video telephone and video conference services. Class 2 indicates data bursts sensitive only to delay time. An example of an application service corresponding to class 2 is Voice over Internet Protocol (VoIP).

Figure 4:
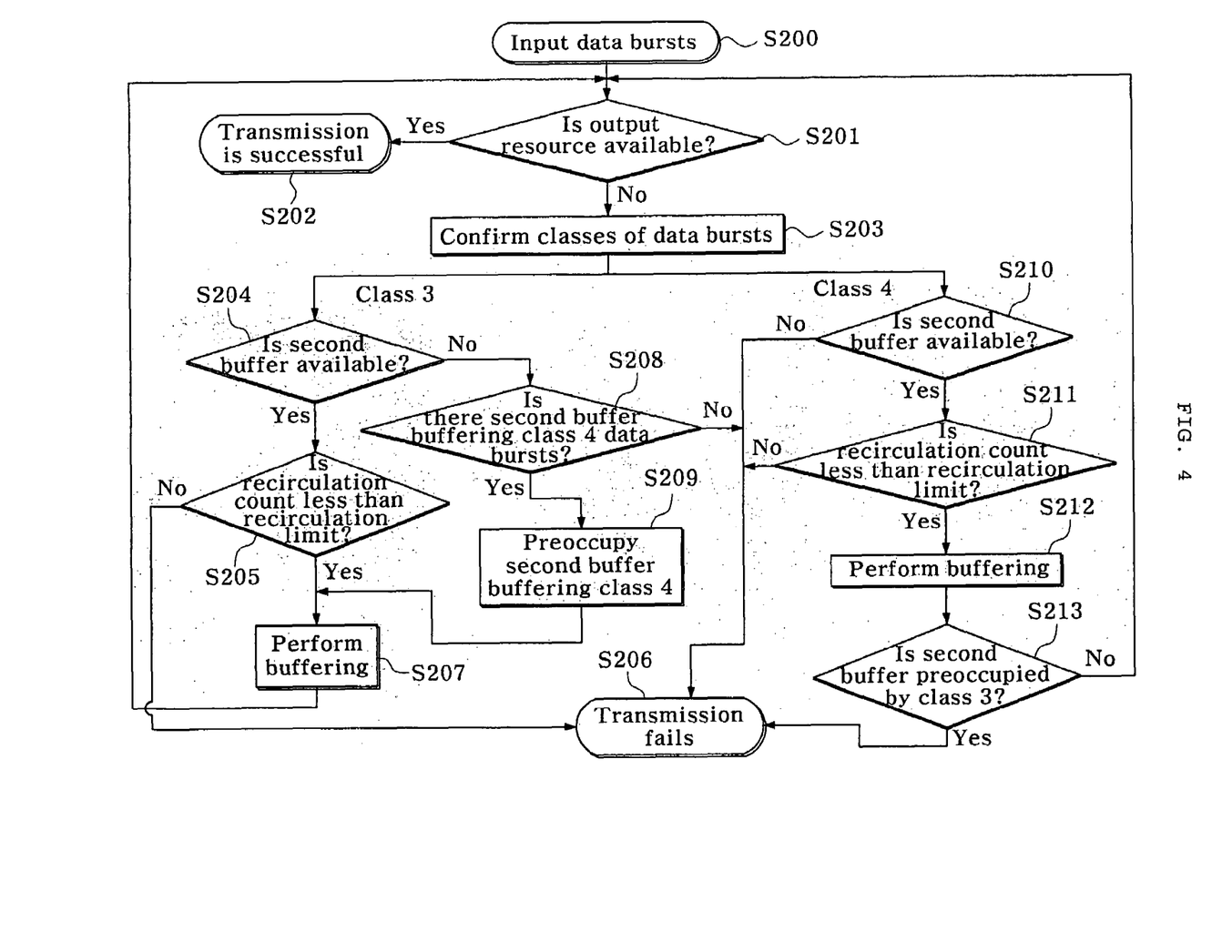
FIG. 4 is a flowchart illustrating a process of transferring data bursts belonging to a class insensitive to delay time in a method for transferring data bursts in an optical burst switching network according to an exemplary embodiment of the present invention.

FIG. 4 is a flowchart illustrating a process of transferring data bursts belonging to a class insensitive to delay time in a method for transferring data bursts in an optical burst switching network according to an exemplary embodiment of the present invention. The process is performed by the control module 250 of FIG. 1 unless stated otherwise.

Referring to FIG. 4, when data bursts are input via the input ports 1 to M of FIG. 1 (S200), it is determined whether output resource (e.g., output wavelengths) is available (S201). When the output resource is available, the input data bursts are successfully transferred (S202). Otherwise, the classes of the data bursts, which indicate the data bursts' sensitivity to delay time and blocking rate, are confirmed (S203). In this case, the classes of the data bursts may be confirmed using information contained in the control packet.

When it is then determined in step S203 that the input data burst belongs to class 3 (which are insensitive to delay time and sensitive to blocking rate), it is determined whether the second buffer 600 of a feedback type of FIG. 1, shared in the node, is available (S204).

When it is determined in step S204 that the second buffer 600 is available, it is determined whether a recirculation count is less than a preset recirculation limit (S205). When the recirculation count is more than the recirculation limit, transmission of the input data burst fails (S206). When the recirculation count is less than the recirculation limit, buffering is performed in the second buffer 600 (S207) and the process returns to step S201.

When it is determined in step S204 that the second buffer 600 is not available, the class 4 data bursts all use the second buffer 600 (S208). When there are no buffered class 4 data bursts (which are insensitive to both delay time and blocking rate), the process returns to step S206 and transmission of data bursts belonging to the input class 3 fails.

When it is determined in step S208 that the class 4 data bursts are buffered in the second buffer 600, the class 4 data bursts are discarded and the process proceeds to step S207 where new class 3 data bursts are buffered in the second buffer 600.

Particularly, a determination is made as to whether to determine output resource availability upon buffering completion, not buffering initiation, and then transmit the data bursts to the output port, or to keep the data burst in the second buffer 600. That is, the data bursts kept in the second buffer 600 are finally blocked when the output resource is not available until the recirculation count reaches the preset recirculation limit.

Meanwhile, when it is determined in step S203 that the input data bursts belong to class 4, it is determined whether the second buffer 600 of a feedback type is available (S210). When the second buffer 600 is not available, the process returns to step S206 and data burst transmission fails.

When it is determined in step 210 that the second buffer 600 is available, it is determined whether the recirculation count is less than the preset recirculation limit (S211). When the recirculation count is less than the recirculation limit, the process returns to step S206 and transmission of the input data bursts fails. When the recirculation count is less than the recirculation limit, buffering is performed in the second buffer 600 (S212) and it is determined whether the second buffer 600 is preoccupied by class 3, i.e., whether class 3 data bursts attempt to use the second buffer 600 (S213). If class 3 data bursts attempt to use the second buffer 600, the process returns to step 206 and the buffered class 4 data bursts concede the buffer to the class 3 data bursts and are lost. Otherwise, the process returns to step S201 where it is determined whether the output resource is available.

That is, newly input data bursts or class 4 data bursts repeatedly circulated in the second buffer 600 of a feedback type remain in the second buffer 600 until the output resource is available. If the class 3 data bursts attempt to use the second buffer 600 in which the class 4 data bursts are buffered due to insufficient buffering space, the second buffer 600 is preempted by the class 3 data bursts and the class 4 data bursts are blocked.

Meanwhile, class 3 indicates data bursts insensitive to delay time and sensitive to blocking rate. An example of an application service corresponding to class 3 is file transfer protocol (FTP). Class 4 indicates data bursts insensitive to both delay time and blocking rate. Examples of application services corresponding to class 4 are web traffic and E-mail traffic.

Figure 5:
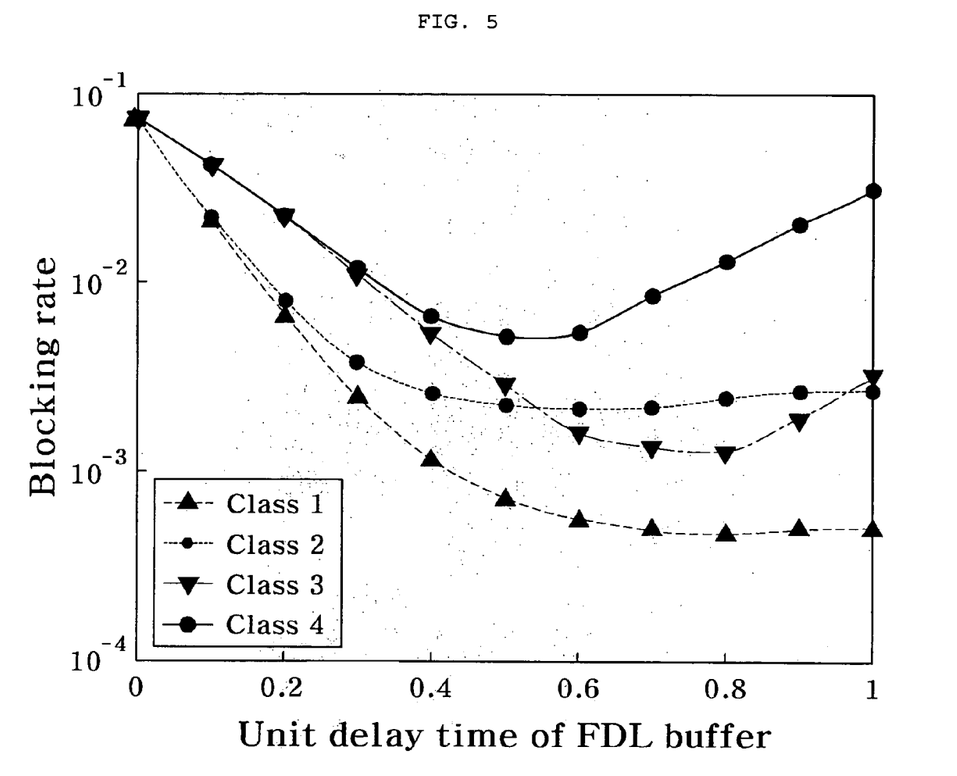
FIG. 5 is a graph of blocking rate versus unit delay time of a fiber delay line (FDL) for different classes when a provided load per wavelength is 0.5 in a method for transferring data bursts in an optical burst switching network according to an exemplary embodiment of the present invention.

FIG. 5 is a graph of blocking rate versus unit delay time of a fiber delay line (FDL) for different classes when a provided load per wavelength is 0.5 in a method for transferring data bursts in an optical burst switching network according to an exemplary embodiment of the present invention.

It can be seen from FIG. 5 that, in each class, as a unit delay time of a fiber delay line (FDL) increases, a blocking rate, i.e., loss rate, decreases. However, the loss rate increases at a certain point of time.

If the fiber delay line (FDL) is short, the buffer is insufficient to absorb a contention time at the output port and the loss rate increases. On the other hand, as the FDL gets longer, the buffer becomes large enough to absorb the contention time and the loss rate decreases.

However, if the FDL increases to a certain length, the loss rate increases again. This is because the data bursts occupying the first buffers 500a to 500n of a feed-forward type reserve the output resource for an unnecessarily long time and accordingly even though there is available output resource, it is not allocated to newly input data bursts.

Notwithstanding, it can be seen that the four classes have sufficiently different loss rates. In FIGS. 3 and 4, the unit delay time of the FDL, zero (0), indicates non-use of the buffer. It can be seen that a great gain is obtained by using the buffer.

Figure 6:
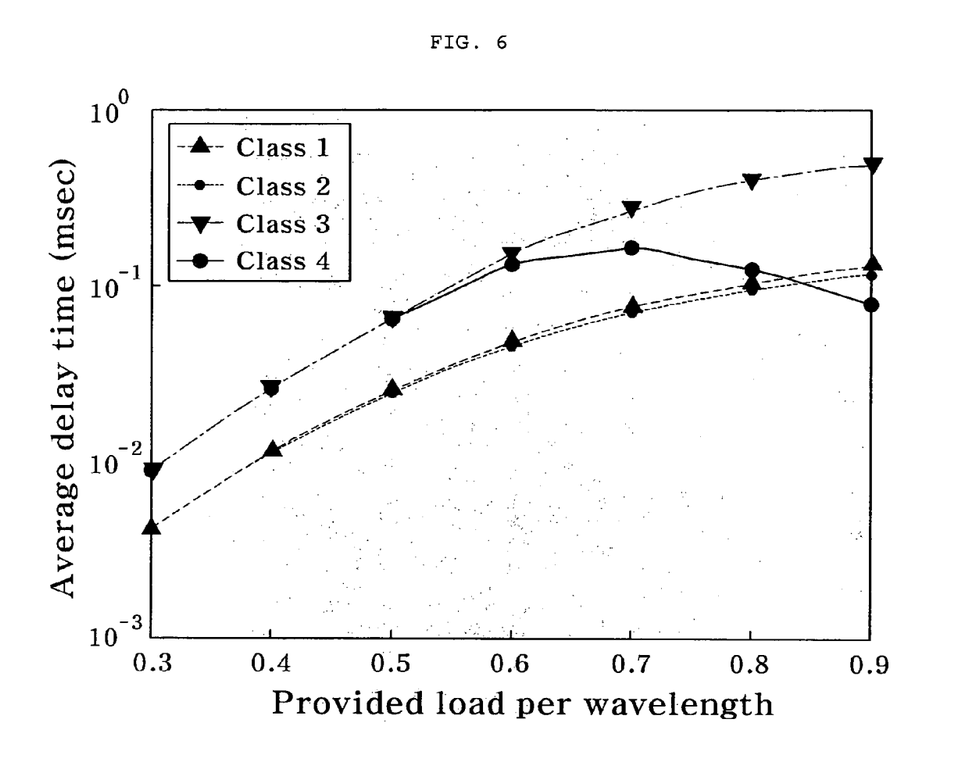
FIG. 6 is a graph of average delay time versus provided load per wavelength for different classes when a unit delay time of an FDL is 0.3 in a method for transferring data bursts in an optical burst switching network according to an exemplary embodiment of the present invention.

FIG. 6 is a graph of average delay time versus provided load per wavelength for different classes when a unit delay time of an FDL is 0.3 in a method for transferring data bursts in an optical burst switching network according to an exemplary embodiment of the present invention.

It can be seen from FIG. 6 that as a provided load per wavelength increases, the delay time increases. That is, as the provided load increases, the number of lost data bursts increases, such that an additional buffer is required and a buffering delay time increases.

That is, classes 1 and 2 which are sensitive to delay time exhibit a significantly short delay time compared to classes 3 and 4 which are insensitive to delay time. However, in the case of class 4, delay time is short for large provided load. This is because most data bursts concede resources to data bursts belonging to another class that is sensitive to blocking rate in a high load state and do not frequently use the buffer.

According to the apparatus and method for transferring data bursts in an optical burst switching network as described above, it is possible to efficiently transfer data bursts with a minimized delay time and a low loss rate and satisfy various service demands, by using a hybrid optical buffer having a feed-forward type buffer shared in each port and a feedback type buffer shared in each node, the hybrid optical buffer using fiber delay lines (FDLs) to provide class-differentiated service in the optical burst switching network.

While the present invention has been described with reference to exemplary embodiments thereof, it will be understood by those skilled in the art that various changes in from and detail may be made therein without departing from the scope of the present invention as defined by the following claims.

What is claimed is:

1. An apparatus for transferring data bursts in an optical burst switching network including a number of nodes, each node including demultiplexers and multiplexers connected to a plurality of input/output ports for transferring the data bursts through a number of wavelengths, the apparatus comprising:
    a control module connected between the demultiplexers and the multiplexers for obtaining information in a control packet to sort and confirm service classes of the data bursts according to delay time and blocking rate;
    a switching unit connected between the demultiplexers and the multiplexers for switching the data bursts to an output port of a corresponding destination node;
    a first buffer connected between the switching unit and the output port for delaying the sorted and confirmed data bursts from the control module once by a preset delay time according to output resource availability and sending them to the output port when the data bursts are sensitive to the delay time; and
    a second buffer connected between an input and an output of the switching unit for circulating and delaying the sorted and confirmed data bursts up to a preset recirculation limit according to output resource availability and then sending the data bursts to the output port when the data bursts are insensitive to the delay time.

2. The apparatus of claim 1, wherein each of the first and second buffers comprises a plurality of fiber delay lines (FDLs), each of the FDLs providing a preset unit delay time D.

3. The apparatus of claim 1, wherein the output resource is an output wavelength.

4. A method for transferring data bursts in an optical burst switching network including a number of nodes, each node including a plurality of input/output ports, the method comprising:
    (a) sorting and confirming the data bursts input via the input ports into a plurality of classes according to sensitivity to delay time and blocking rate;
    (b) delaying the data bursts belonging to a class sensitive to the delay time once by a preset delay time and then transmitting the data bursts to the output port; and
    (c) circulating and delaying the data bursts belonging to a class insensitive to the delay time up to a preset recirculation limit and then transmitting the data bursts to the output port, wherein in step (b), the data bursts belonging to a class insensitive to the delay time and blocking rate among the sorted and confirmed classes have a higher priority than the data bursts belonging to the class sensitive only to the delay time.

5. The method of claim 4, wherein the data bursts belonging to the class sensitive to the delay time and the blocking rate are for video conference or video telephone service, and the data bursts belonging to the class sensitive only to the delay time are for Voice over Internet Protocol (VoIP) service.

6. A method for transferring data bursts in an optical burst switching network including a number of nodes, each node including a plurality of input/output ports, the method comprising:
    (a) sorting and confirming the data bursts input via the input ports into a plurality of classes according to sensitivity to delay time and blocking rate;
    (b) delaying the data bursts belonging to a class sensitive to the delay time once by a preset delay time and then transmitting the data bursts to the output port; and
    (c) circulating and delaying the data bursts belonging to a class insensitive to the delay time inserted therefor. up to a preset recirculation limit and then transmitting the data bursts to the output port, wherein in step (c), the data bursts belonging to a class insensitive to the delay time but sensitive to the blocking rate among the sorted and confirmed classes have a higher priority than the data bursts belonging to a class insensitive to both the delay time and the blocking rate.

7. The method of claim 6, wherein the data bursts belonging to the class insensitive to the delay time but sensitive to the blocking rate are for file transfer protocol (FTP) service, and the data bursts belonging to the class insensitive to the delay time and the blocking rate are for web or E-mail traffic service.

* * * * *

UNITED STATES PATENT AND TRADEMARK OFFICE
CERTIFICATE OF CORRECTION

PATENT NO. : 7,620,044 B2  Page 1 of 1
APPLICATION NO. : 11/496200
DATED : November 17, 2009
INVENTOR(S) : Choi et al.

It is certified that error appears in the above-identified patent and that said Letters Patent is hereby corrected as shown below:

(1) On the Title Page, See Item (56) References Cited, OTHER PUBLICATIONS, "Architectures and Performance of Fiver" should read
-- Architectures and Performance of Fiber --

(2) On the Title Page, See Item (73) Assignee:, line 2, "Dae-Shi" should read
-- Daejeon-shi --

(3) Column 10, Line 15, Claim 4, "insensitive" should read -- sensitive --

(4) Column 10, Line 35, Claim 6, "delay time inserted therefor." should read
-- delay time up to --

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,620,044 B2
APPLICATION NO. : 11/496200
DATED : November 17, 2009
INVENTOR(S) : Choi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this

Twenty-sixth Day of October, 2010

David J. Kappos
*Director of the United States Patent and Trademark Office*